US005720836A

United States Patent [19]

Gallagher et al.

[11] Patent Number: 5,720,836

[45] Date of Patent: Feb. 24, 1998

[54] DEVICE FOR AND METHOD OF ALIGNING AND/OR MAINTAINING A SIDE OF A SPACER FRAME IN ALIGNMENT DURING FABRICATION OF A MULTI SHEET GLAZING UNIT

[75] Inventors: Raymond G. Gallagher, Pittsburgh; Barent A. Rosskamp, Butler; Paul J. Kovacik, Ford City; Albert E. Thompson, Jr., New Kensington, all of Pa.

[73] Assignee: PPG Industries, Inc., Pittsburgh, Pa.

[21] Appl. No.: 518,216

[22] Filed: Aug. 23, 1995

[51] Int. Cl.$^6$ .............................. B32B 31/00; C03B 23/24

[52] U.S. Cl. .................................. 156/109; 269/8; 269/21

[58] Field of Search .................................... 156/109, 107, 156/99, 156; 269/8, 21

[56] References Cited

U.S. PATENT DOCUMENTS 4,495,023 1/1985 Lisec ....................................... 156/109

FOREIGN PATENT DOCUMENTS 0 475 213 3/1992 European Pat. Off. .
1454685 11/1976 United Kingdom .
2015628 9/1979 United Kingdom .

OTHER PUBLICATIONS

Communication with European Search Report of EP Application No. 96113044.0 dated Dec. 23, 1996 (4 pages).

*Primary Examiner*—Michael W. Ball
*Assistant Examiner*—Michael A. Tolin
*Attorney, Agent, or Firm*—Donald C. Lepiane

[57] ABSTRACT

Magnetic forces are applied to a side of a spacer frame mounted on a glass sheet to maintain the side of the spacer frame in alignment i.e. the plane containing base of the spacer frame perpendicular to the plane containing the surface of the glass to which the spacer frame is adhered. Thereafter a glass sheet is mounted on the other surface of the spacer frame. The sheets are adhered to the spacer frame by a sealant layer. After the sheets are assembled, the sheets are urged toward one another to flow the sealant to seal the space between the sheets.

21 Claims, 4 Drawing Sheets

DEVICE FOR AND METHOD OF ALIGNING AND/OR MAINTAINING A SIDE OF A SPACER FRAME IN ALIGNMENT DURING FABRICATION OF A MULTI SHEET GLAZING UNIT

FIELD OF THE INVENTION

This invention relates to the manufacture of a glazing unit, and more particularly, to a method of aligning and/or maintaining one or more sides of a spacer frame in alignment during fabrication of a multi sheet glazing unit.

DISCUSSION OF RELEVANT ART AND TECHNICAL PROBLEMS

European Patent Application Publication No. 0 475 213 A1 published 18.03.92 in Bulletin 92/12 (hereinafter "EP Application") based on U.S. patent application Ser. Nos. 578,696 and 578,697, each filed Sep. 4, 1995, and 686,956 filed Apr. 18, 1991, discloses a low thermal edge multi sheet glazing unit having glass sheets separated by an edge assembly. The edge assembly includes, among other things, a metal spacer frame having a pair of upright legs spaced from one another and only interconnected by a base to provide the upright legs and base of the spacer with a generally U-shaped cross section. A moisture impervious sealant is provided on outer surfaces of the upright legs, and optionally on the outer surface of the base, and a moisture pervious adhesive having a desiccant therein is provided on the inner surface of the base.

In the fabrication of an insulating unit e.g. of the type disclosed in the EP Application, one of the upright legs of the spacer frame is adhered to marginal edge of one of the outer sheets by the sealant; thereafter, the other sheet is positioned on the other upright leg of the spacer frame and adhered thereto by the sealant. The sheets are biased toward one another to flow the sealant to seal the airspace between the sheets. Prior to positioning the second sheet on the sealant of the upright leg of the spacer frame, the side(s) of the spacer frame when of extended length has (have) a tendency to slump when the unit is being fabricated with the glass sheets in a generally vertical position and to bend inwardly when the unit is being fabricated with the glass sheets in a generally horizontal position.

As can be appreciated, prior to positioning the second sheet on the second upright leg of the spacer frame, the side(s) of the spacer frame should be aligned e.g. the base of the spacer frame should be generally perpendicular to the adjacent surface of the glass sheet to obtain a proper seal and desired aesthetics. It would be advantageous therefore to provide a technique to align the sides of the spacer frame with the glass sheet(s) during fabrication of the insulating unit.

SUMMARY OF THE INVENTION

Figure 1:
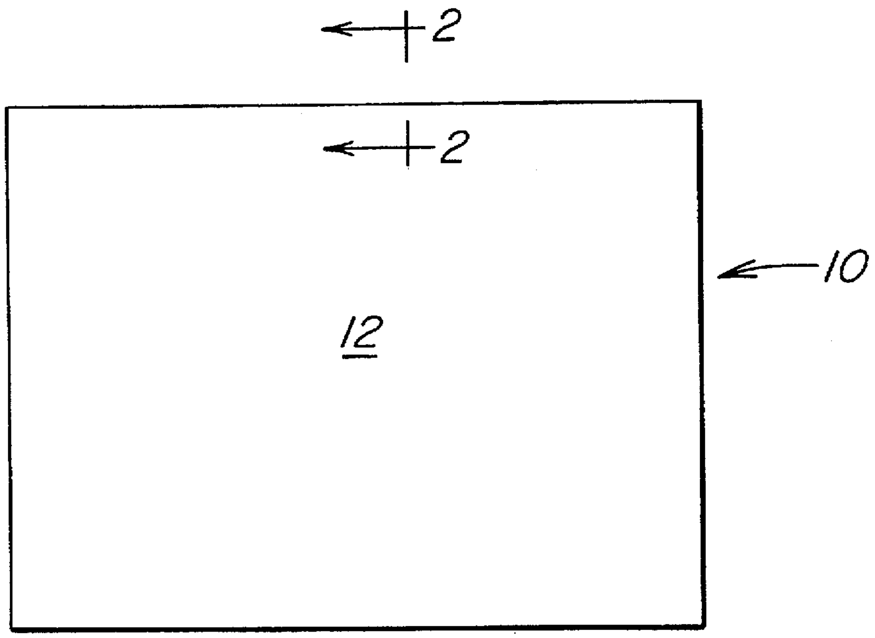
FIG. 1 is an elevated frontal view of a multi sheet unit fabricated in accordance with the disclosure of the invention.

This invention relates to a method of manufacturing a multi sheet unit that includes the step of maintaining in alignment a side(s) of a spacer frame secured to a sheet. As used herein and in the claims, a side of the spacer frame is that portion of the spacer frame between adjacent two corners of the spacer frame. Further, as used herein and in the claims, a side of a spacer frame is in alignment when the surface of the sheet to which the spacer frame is attached lies in a plane that is generally perpendicular to a plane containing the outer surface of the base of the spacer frame. The multi sheet unit e.g. a double sheet glazing unit includes the spacer frame between and secured to each of the marginal edges of the sheets. The method includes, among other things, positioning the spacer frame on marginal edges of one of the sheets e.g. a first sheet on edge in a vertical position. The spacer frame is adhered to the first sheet by a layer of a sealant on outer surfaces of a leg of the spacer frame. After adhering the spacer frame to the first sheet, a side of the spacer frame may not be in alignment.

The side of the spacer frame not in alignment due to slumping of the side when the glass sheets are assembled in the vertical position is due to gravity acting on the side of the spacer frame and/or stresses set up in the spacer frame during shaping of a flat metal strip into spacer stock and thereafter into the spacer frame. The bending of the sides of the spacer frame when the sheets are assembled in the horizontal position is due to the stresses set up in the spacer frame during fabrication as previously discussed.

The side(s) of the spacer frame not in alignment is (are) moved into alignment and maintained in alignment by applying a force e.g. a magnetic field or vacuum to the side of the spacer frame out of alignment to maintain the side of the spacer frame in alignment. While the side of the spacer frame is in alignment, a second sheet is positioned on a layer of sealant on the outer surface of the other leg of the spacer frame. The sheets are then biased toward one another to secure the sheets in position about the spacer frame and to seal the compartment between the sheets and within the perimeter of the spacer frame. Thereafter the applied force is removed. As can be appreciated, the applied force may be removed prior to the positioning of the second sheet on the spacer frame, provided the side(s) of the spacer frame remain in alignment.

The invention also relates to a work or assembly station to practice the method. The workstation includes facilities for supporting the first sheet having the spacer frame adhered thereto e.g. facilities for supporting the sheet on edge in a vertical position or in a horizontal position. Aligning facilities e.g. a magnetized rod or a vacuum cup is mounted on the supporting facilities to engage the side of the spacer frame out of alignment to align and/or maintain the side of the spacer frame in alignment.

In the practice of the invention, the spacer frame is preferably made of metal e.g. stainless steel or galvanized iron responsive to magnetic forces; however, spacer frames made of non-metal or metal non-responsive to magnetic forces may have magnetically sensitive portions e.g. a metal disc adhered thereto in accordance with the practice of the invention.

DESCRIPTION OF THE INVENTION

Figure 2:
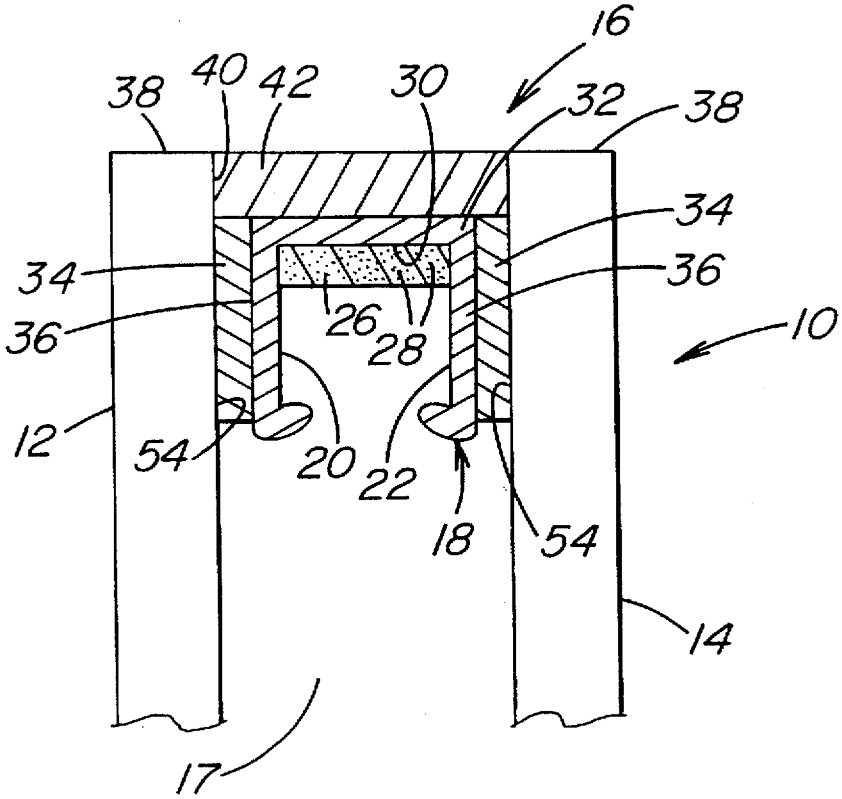
FIG. 2 is a view taken along lines 2—2 of FIG. 1.

With reference to FIGS. 1 and 2 there is shown a multi sheet unit 10 fabricated in accordance with the teachings of the instant invention. The unit 10 includes a sheet 14 e.g. a first sheet joined to another sheet 12 e.g. a second sheet by an edge assembly 16 to provide a sealed compartment between the sheets. The edge assembly 16 includes a spacer frame 18 having in cross section as viewed in FIG. 2 a pair of outer legs 20 and 22 spaced from one another and joined by a base 24. The outer legs 20 and 22 may also be referred to as upright legs. This nomenclature is selected because the spacer frame when viewed in cross section is considered to have a "U" shape. For ease of discussion the "U" is considered upright regardless of whether it is upright or inverted as shown in FIG. 2. The outer legs 20 and 22 therefore for ease of discussion are considered upright regardless of whether they are upright or downward as shown in FIG. 2. A layer 26 of a moisture pervious adhesive material having a desiccant 28 is on inner surface 30 of base 32 of the spacer frame 18. A layer 34 of a moisture impervious sealant is provided on outer surface 36 of each of the outer legs 20 and 22. In certain instances, the spacer frame 18 is set in from the peripheral edges 38 of the sheets 12 and 14 to provide a peripheral channel 40 that is filled with a moisture impervious sealant 42.

As can be appreciated, the invention is not limited to the material of the sheets which may be coated and/or uncoated sheets of glass, plastic and/or metal. Further the invention is not limited to the materials of sealants or the adhesive material and/or the material of the spacer frame.

A more complete discussion of the unit 10 having the edge assembly 16 is disclosed in the EP Application which disclosure is hereby incorporated by reference.

Figure 3:
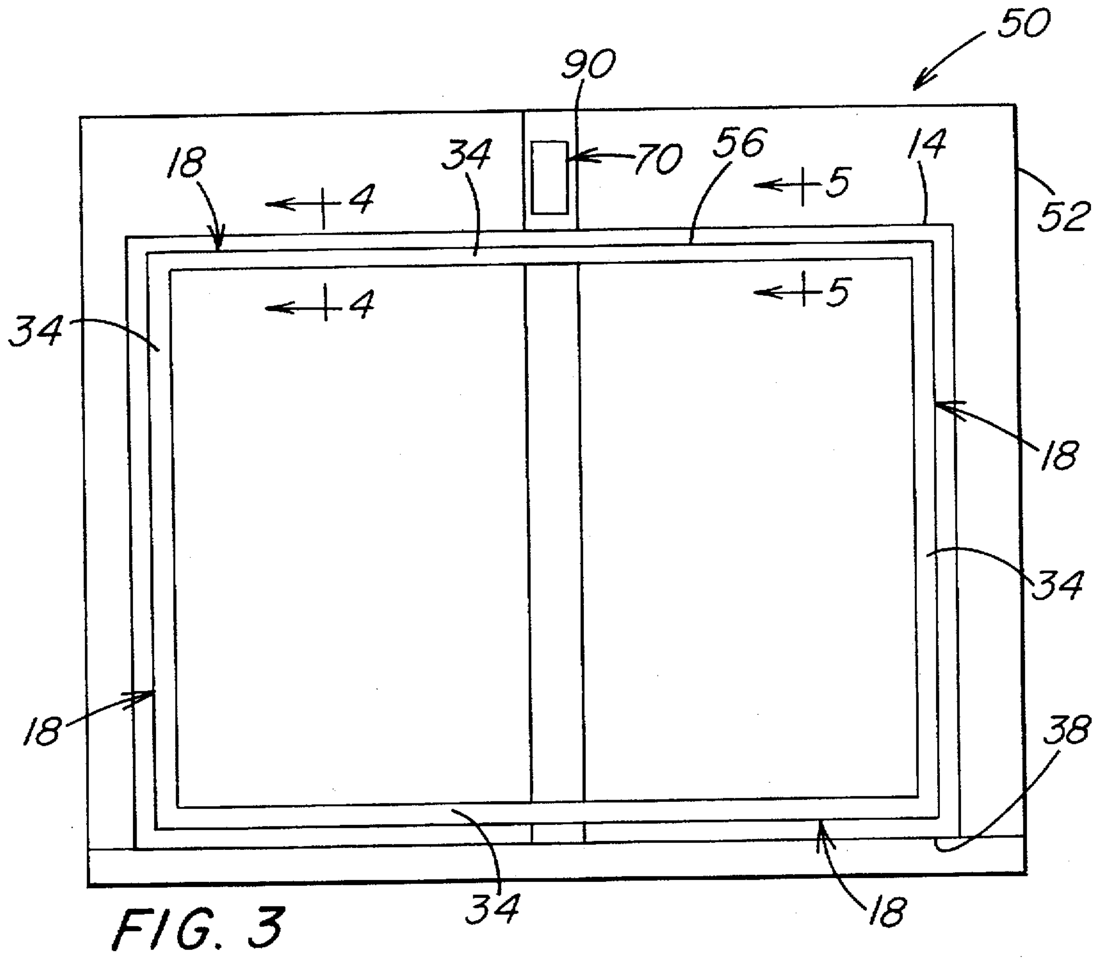
FIG. 3 is an elevated frontal view of an assembly station incorporating features of the invention to align a side of a spacer frame in accordance with the disclosure of the invention.

With reference to FIG. 3 the discussion will now be directed to vertical work or assembly station 50 incorporating features of the invention. The sheet 14 e.g. a first glass sheet was supported on one of the peripheral edges 38 in a generally vertical position and tilted toward backwall 52. The spacer frame 18 of the type previously discussed above and in the EP Application was adhered to marginal edge portions 54 of a major surface of the sheet 14 spaced inwardly from the peripheral edges of the sheet (see also FIG. 2).

Figure 4:
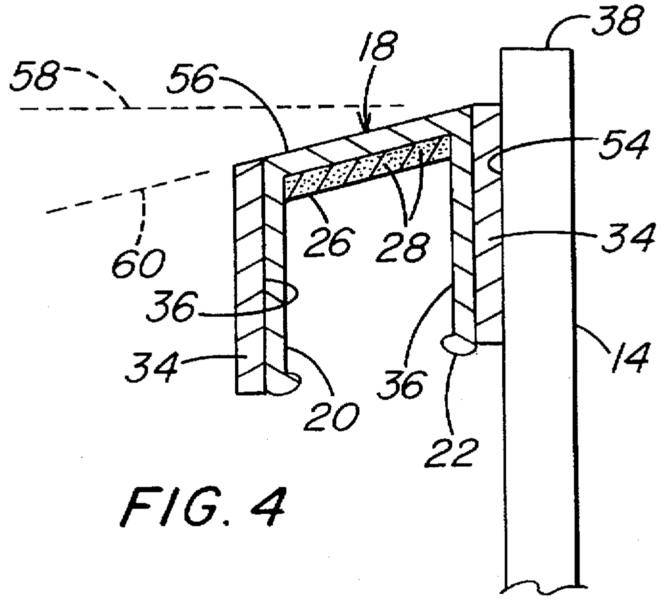
FIG. 4 is a view taken along lines 4—4 of FIG. 3 and having portions removed for purposes of clarity illustrating a side of the spacer frame out of alignment.

With continued reference to FIGS. 3 and 4 the spacer frame 18 was maintained on the marginal edge portions 54 of a major surface of the first glass sheet 14 by the sealant layer 34 on outer surface 36 of the upright leg 22. The adhesive layer 26 having the desiccant 28 was mounted on the inner surface 30 of the base 32, and the sealant layer 34 was on outer surface 36 of the upright leg 20. As shown in FIG. 4, due to the weight of the spacer frame, sealant layer 34 on the upright leg 20 and the adhesive layer 26 having desiccant 28, upper side 56 of the spacer frame as shown in FIG. 3 tilts downwardly as shown in FIG. 4; more particularly, the side 56 was out of alignment as indicated by dotted lines 58 and 60.

Figure 5:
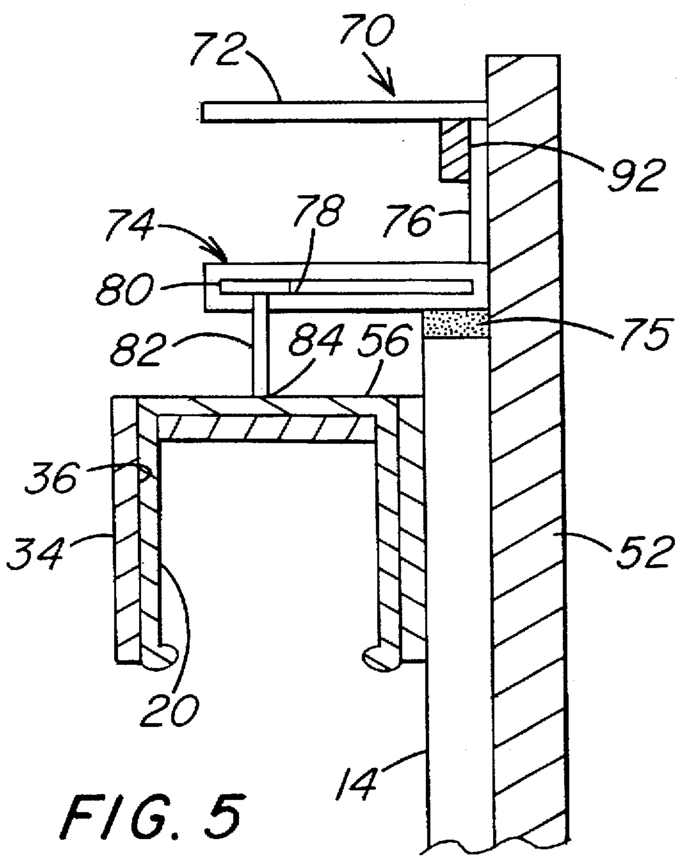
FIG. 5 is a view taken along lines 5—5 of FIG. 3 and having portions removed for purposes of clarity illustrating the device of the invention to maintain the side of the spacer frame in alignment in accordance with the disclosure of the invention.

Mounted above the side 56 of the spacer frame 18 was a device 70 incorporating features of the inventions. With reference to FIG. 5, the device 70 included a horizontal leg 72 joined to leg member 74 by intermediate leg 76 to provide a generally "C" shape cross section, as viewed in FIG. 5. The member 74 had a cavity 78 in which was positioned a magnet 80. Mounted in the member 74 was a metal rod 82 having one end in the cavity in contact with the magnet 80 and extended downwardly as viewed in FIG. 5 away from the member 74. A resilient pad 75 was provided on the outer surface of the member 74 to prevent damage to the edge of the sheet. After the first sheet 14 having the spacer frame 18 was positioned on the backwall 52 of the workstation, the clamp 70 was positioned to set end 84 of the rod 82 in the plane having the base of the spacer frame when the side of the spacer frame is in alignment. Thereafter the side 56 of the spacer frame out of alignment was raised manually to engage the end 84 of the rod 82 as shown in FIG. 5, to maintain the side 56 of the spacer frame in alignment by magnetic forces. Thereafter, the sheet 12 is urged against the sealant layer 34 on outer surface 36 of the leg 20 of the spacer frame. The device 70 is then removed, and the sheets pressed together in a usual manner to flow the sealant layers and seal the compartment 17 between the sheets (see FIG. 2).

As can be appreciated, the magnetic field may be increased to raise the side of the spacer frame out of alignment into alignment and maintain the side in alignment thereby eliminating the manually raising of the side.

As used herein when the device 70 is maintaining the side of the spacer frame in alignment or the end 84 of the rod is in the plane of the base when the side of the spacer frame is aligned, the device is in the aligning position; when the device is not maintaining the side of the spacer frame in alignment or the end of the rod is not in the plane containing the base, the device is in the non-aligning position.

As can be appreciated, the invention is not limited to the design of the holder for the magnet nor the force of the magnet. For example the clamp 70 is preferably made of aluminum; however, it may be made of any material e.g. plastic, stainless steel, wood. In regards to the force applied by the magnet, it should be sufficient to hold the side of the spacer frame in alignment. In the practice of the invention, a spacer frame having a thickness of 0.010 inch, a base having a width of 21/32 inch, the legs having a height of 0.300 inch, a sealant layer having a thickness of 0.030–0.040 inch and an adhesive layer having a width of 21/32 and thickness of 0.080–0.100 inch having a desiccant and a length of about 2.1 meters required a force of 7 oz. to maintain the side of the spacer frame in the line of alignment. The degree of slump, in other words, the intersection angle between the first plane and second plane measured 13°. A magnet having a force of 7 oz. or greater was sufficient to hold the side of the spacer frame having the dimensions discussed above in the line of alignment.

One technique to determine an acceptable force or number of magnets to hold the side of the spacer frame in alignment is to urge the base of the side of the spacer frame out of alignment against a magnet. If the side out of alignment is not held in alignment, there is insufficient force; the strength of the magnet should be increased or the number of magnets increased.

The device may be mounted in the aligning position in any usual manner. For example and with reference to FIGS. 3 and 5, a vertical plate 90 was mounted in the backwall. A magnet 92 was mounted on the intermediate leg 76 of the C clamp to secure the clamp to the vertical wall.

Figure 7:
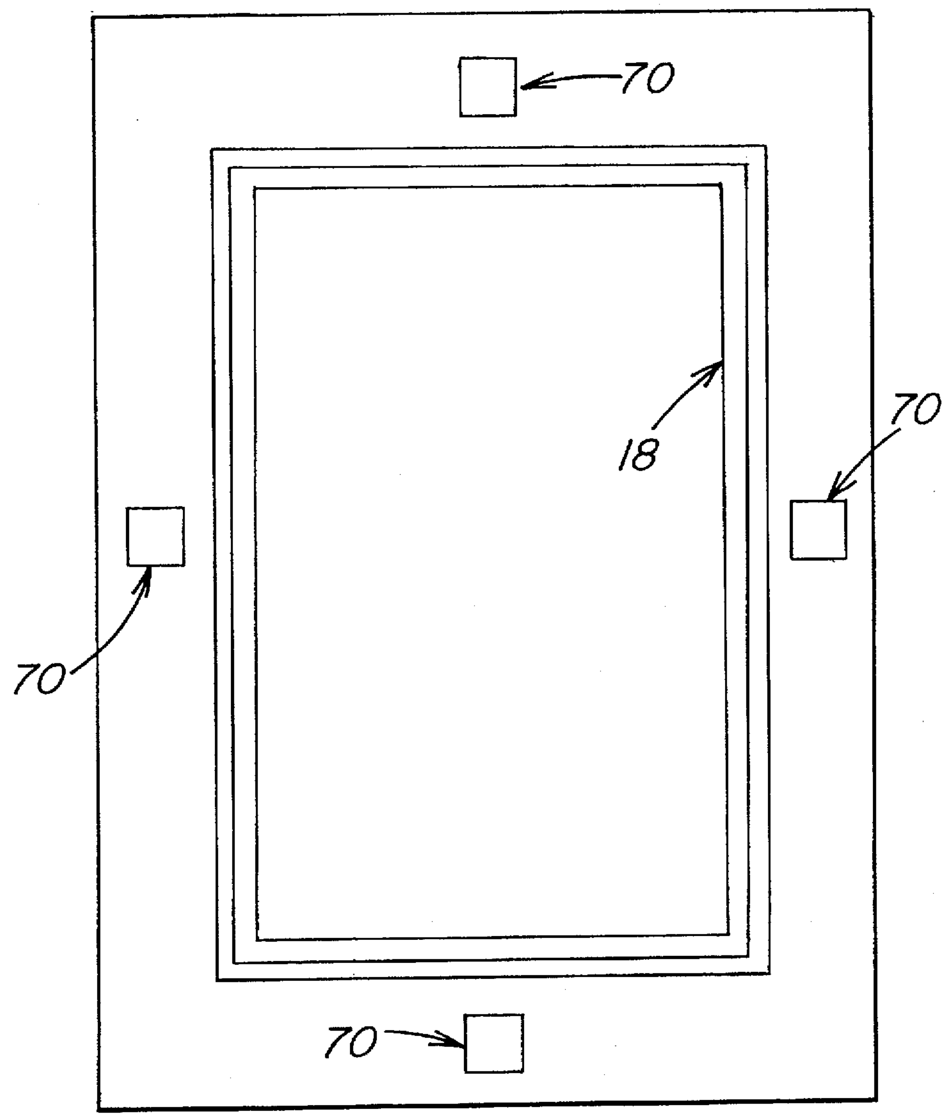
FIG. 7 is an elevated top view of a horizontal assembly station incorporating features of the invention.

With reference to FIG. 7 there is shown a horizontal assembly station. For horizontal assembly stations as well as vertical assembly stations, magnets may be provided at each side of the spacer frame as shown in FIG. 7.

The practice of the invention is not limited to spacer frames made of metal e.g. stainless steel, galvanized iron. For example, but not limiting to the invention, if the spacer frame is made of a non-magnetic material e.g. aluminum or plastic, a magnetically sensitive disc e.g. disc 100 shown in FIG. 6 may be adhered to outer surface 102 of base 104 of the spacer frame 106 and/or the adhesive layer 26 may contain filings of a magnetically sensitive material.

Figure 6:
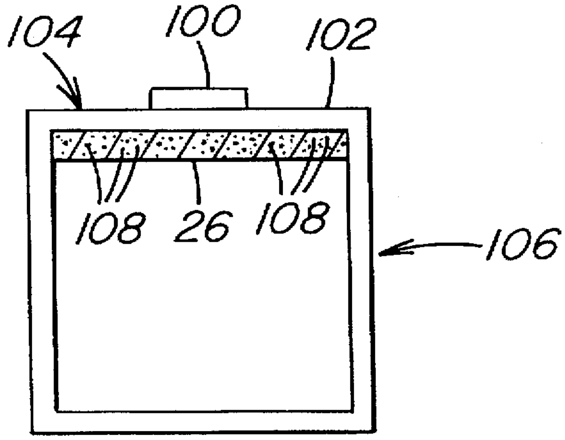
FIG. 6 is a cross sectional view of a side of a spacer frame modified in accordance with the disclosure of the invention.

Further, the invention is not limited to a spacer frame having a "U" shaped cross section, e.g. the spacer frame may have box shaped cross section as shown in FIG. 6. Further, the spacer frame may have the base continuous around one or more corners or may have sections joined together as taught in the EP Application.

Still further, the invention is not limited to the sealant adhering the spacer frame to the metal and any type of sealant may be used.

Figure 8:
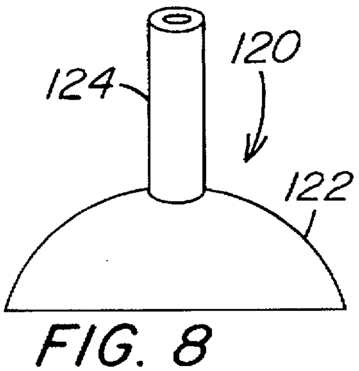
FIG. 8 is an elevated side view of a suction cup arrangement that may be used in the practice of the invention.

With reference to FIG. 8, there is shown a vacuum device 120 that may be used to apply a force to the side of the spacer frame to maintain the side in alignment. The vacuum device 120 includes a vacuum cup 122 and a conduit 124 connected in any usual manner to a vacuum and/or pressure supply. In practice, a negative pressure may be pulled through the conduit 124 to maintain the side of the spacer frame in position. To release the vacuum cup, air under pressure may be moved through the conduit and/or the application of negative pressure may be terminated.

Figure 9:
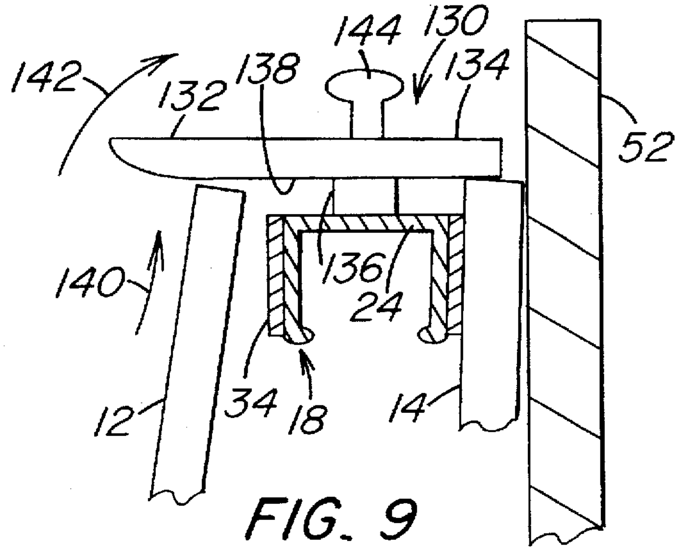
FIG. 9 is a view similar to the view of FIG. 5 illustrating an alternate embodiment of a magnetic device of the instant invention to align a side of a spacer frame.

Shown in FIG. 9 is another embodiment of the invention. The sheet 14 having the spacer frame 18 adhered to as previously discussed is supported on edge in the vertical position by the backwall 52. A device 130 incorporating features of the invention includes a flat member 132 having edge 134 supported on peripheral edge of the sheet 14. The member 132 is held in position by magnet 136 secured to undersurface 138 of the flat member 132 and adhered to the base 24 of the spacer frame 18 by magnetic force. The peripheral edge of the sheet 12 is moved under the device 132 in an upward direction as noted by arrowed line 140. The device 130 pivots in the direction of the arrowed line 142 to raise the device 132 and raise the side of the spacer frame into alignment. After the sheet 12 is in position e.g. adhered to the spacer frame by the layer 34 of the moisture impervious sealant, the device 130 is removed e.g. by lifting knob 144.

As can now be appreciated, the embodiments of the invention discussed herein are not limiting to the invention and were presented for illustration purposes only. For example, in the instance where the sealant is a curable material, the sides of the spacer frame may be maintained in alignment practicing the invention while the material cures. Other embodiments as well as variations to the embodiments of the invention presented herein may be made within the scope of the invention.

What is claimed is:

1. A method of aligning a side of a spacer frame during fabrication of a multi sheet unit comprising the steps of:

providing a spacer frame having a base and a pair of upright legs defined as a first leg and a second leg spaced from one another and joined to the base;

providing a sealant layer on outer surfaces of the upright legs;

mounting the first leg of the spacer frame by way of the sealant layer on marginal edge portions of a major surface of a first sheet:

urging the spacer frame against the marginal edge portions of the first sheet wherein at least one side of the spacer frame is out of alignment and the at least one side is responsive to magnetic forces: then applying a magnetic field to the at least one side of the spacer frame to move the at least one side into alignment; and positioning a second sheet onto the spacer frame after the at least one side of the spacer frame is in alignment.

2. The method as set forth in claim 1 wherein the spacer frame is made of stainless steel.

3. The method as set forth in claim 1 wherein the spacer frame is made of a material that is non responsive to magnetic forces and further including the step of modifying the at least one side of the spacer frame out of alignment to be responsive to magnetic forces.

4. The method as set forth in claim 3 wherein the at least one side of the spacer frame out of alignment has a magnetic substrate applied thereto.

5. The method as set forth in claim 3 wherein the at least one side of the spacer frame out of alignment has a material adhered thereto that has metal filling mixed therewith.

6. The method as set forth in claim 1 wherein the mounting step includes mounting the sheet on edge and supported in a vertical position by a vertical support surface and the urging step is practiced at selected sides of the spacer frame.

7. The method as set forth in claim 6 wherein the applying step includes providing a magnet, engaging the at least one side of the spacer frame out of alignment by the magnet, moving the magnet to move the at least one side out of alignment into the alignment position.

8. The method as set forth in claim 1 wherein the positioning step includes mounting the second sheet on the spacer frame, discontinuing the practice of the applying step and biasing the sheets toward one another to flow the sealant to provide a sealed compartment between the sheets.

9. The method as set forth in claim 8 wherein each sheet has peripheral edges, and the base of the spacer frame has an outer surface defined as the surface facing the peripheral edges of the sheets, and the outer surface of the base is inset from the peripheral edges of the sheets after the practice of the step wherein the outer surface of the base and the marginal edge portions of the sheets facing one another defines a channel, and further including the step of flowing a sealant in the channel.

10. The method as set forth in claim 9 wherein the sheets are glass sheets.

11. The method as set forth in claim 10 wherein the base of the spacer frame has an inner surface opposite the outer surface and further including the step of providing a layer of a moisture pervious adhesive having a desiccant therein on the inner surface of the base.

12. The method as set forth in claim 1 wherein the mounting step includes mounting the sheet on a horizontal support surface and the applying step is practiced at selected sides of the spacer frame.

13. The method as set forth in claim 12 wherein the spacer frame has four sides and the apply step is practiced at each side of the spacer frame.

14. The method as set forth in claim 1 wherein the applying step includes the steps of providing a device including a substrate having a magnet, mounting a portion of the substrate on peripheral edge of the first sheet with the magnet engaging the at least one side of the spacer frame out of alignment, and moving peripheral edge of the second sheet into engagement with the substrate to move the at least one side into alignment.

15. The method as set forth in claim 1 wherein the practice of the applying step is continued during the practice of the urging step.

16. The method as set forth in claim 1 wherein the step of providing a spacer frame includes the step of forming the spacer frame to have a generally U-shaped cross section with the legs only interconnected by the base.

17. A method of aligning a side of a spacer frame during fabrication of a multi sheet unit comprising the steps of:

providing a spacer frame having a pair of outer legs defined as a first leg and a second leg, the first and second legs spaced from one another and interconnected by base;

providing a sealant layer on outer surfaces of the first and second legs;

mounting the first leg of the spacer frame by way of the sealant layer on marginal edge portions of a major surface of a first sheet, wherein the at least one side of the spacer frame is out of alignment; then applying a vacuum to the at least one side of the spacer frame to move the at least one side into alignment and to maintain the at least one side of the spacer frame in alignment, and positioning a second sheet onto the second leg of the spacer frame after the at least one side of the spacer frame is in alignment.

18. The method as set forth in claim 17 wherein the step of providing a spacer frame includes the step of forming the spacer frame to have a generally U-shaped cross section with the legs only interconnected by the base.

19. A method of aligning a side of a spacer frame during fabrication of a multi sheet unit, the unit having a first sheet spaced from a second sheet by a spacer frame, each of the sheets having a major surface and the spacer frame in cross section having a base connecting a first leg and a second leg to have a generally U-shape, wherein the spacer frame has at least one side and the at least one side is in an aligned position when major surface of the base of the spacer frame lies in a plane that is generally perpendicular to a plane having a major surface of the first sheet and the at least one side in a position other than the aligned position is in a non-aligned position, comprising the step of:

providing a layer of moisture impervious sealant on outer surface of the first leg and on outer surface of the second leg;

mounting the first leg of the spacer frame by way of the sealant on marginal edge portions of the major surface of the first sheet wherein after the practice of the mounting step the at least one side of the spacer frame is in a non-aligned position;

then engaging the at least one side of the spacer frame with a device;

then applying a force by way of the device to the at least one side of the spacer frame to move the at least one side of the spacer frame toward the aligned position, and then moving the at least one side of the spacer frame into the aligned position, while positioning marginal edge portions of the second sheet onto the outer surface of the second leg of the spacer frame to provide a multi sheet unit.

20. The method as set forth in claim 19 wherein the device includes a substrate having a spacer frame engaging member, the engaging step includes mounting a portion of the substrate on peripheral edge of the first sheet with the spacer frame engaging member engaging the at least one side of the spacer frame out of alignment, and the applying and moving steps are practiced by moving peripheral edge of the second sheet into engagement with the substrate to move the at least one side into alignment, and further including the step of removing the device from the peripheral edges of the first sheet and the second sheet.

21. The method as set forth in claim 19 wherein the spacer frame legs are only interconnected by the base.

* * * * *